United States Patent
Sung et al.

(10) Patent No.: US 11,998,159 B2
(45) Date of Patent: Jun. 4, 2024

(54) VACUUM CLEANER AND CONTROL METHOD THEREOF

(71) Applicant: LG ELECTRONICS INC., Seoul (KR)

(72) Inventors: Chulmo Sung, Seoul (KR); Hyungjin Jeon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 788 days.

(21) Appl. No.: 17/054,860

(22) PCT Filed: May 16, 2019

(86) PCT No.: PCT/KR2019/005862
§ 371 (c)(1),
(2) Date: Nov. 12, 2020

(87) PCT Pub. No.: WO2019/221524
PCT Pub. Date: Nov. 21, 2019

(65) Prior Publication Data
US 2021/0212541 A1 Jul. 15, 2021

(30) Foreign Application Priority Data
May 16, 2018 (KR) .................. 10-2018-0056135

(51) Int. Cl.
*A47L 9/00* (2006.01)
*A47L 9/28* (2006.01)
(Continued)

(52) U.S. Cl.
CPC ............ *A47L 9/009* (2013.01); *A47L 9/2826* (2013.01); *A47L 9/2852* (2013.01);
(Continued)

(58) Field of Classification Search
CPC ...... A47L 9/009; A47L 9/2826; A47L 9/2852; A47L 11/4011; A47L 11/4061;
(Continued)

(56) References Cited

U.S. PATENT DOCUMENTS 4,954,962 A * 9/1990 Evans, Jr. ............ G05D 1/0246
701/28
9,992,422 B2 * 6/2018 Hung .................... G05D 1/0234
(Continued)

FOREIGN PATENT DOCUMENTS

CN 103941735 7/2014
CN 104597902 5/2015
(Continued)

OTHER PUBLICATIONS

International Search Report dated Sep. 10, 2019 issued in Application No. PCT/KR2019/005862.
(Continued)

*Primary Examiner* — Abby Y Lin
*Assistant Examiner* — Kyle T Johnson
(74) *Attorney, Agent, or Firm* — KED & Associates LLP

(57) ABSTRACT

A self-driving vacuum cleaner may include: a main body; a drive unit; a pattern irradiation unit, disposed on a front surface of the main body, for irradiating light; a camera, disposed on the front surface of the main body; and a controller for detecting a light pattern formed by the pattern irradiation unit using an image photographed by the camera, determining whether an obstacle exists in front of the main body on the basis of the brightness of the detected light pattern, and controlling the drive unit to pass or avoid the obstacle on the basis of the determination result.

12 Claims, 10 Drawing Sheets

(51) Int. Cl.
   *A47L 11/40* (2006.01)
   *G05D 1/00* (2006.01)
   *G06V 20/58* (2022.01)

(52) U.S. Cl.
   CPC ....... *A47L 11/4011* (2013.01); *A47L 11/4061* (2013.01); *G05D 1/0248* (2013.01); *G05D 1/0251* (2013.01); *G06V 20/58* (2022.01); *A47L 2201/04* (2013.01)

(58) Field of Classification Search
   CPC .... A47L 2201/04; A47L 2201/06; A47L 9/28; A47L 9/2805; B25J 9/1666; B25J 9/1676; B25J 19/022; B25J 19/023; G06T 1/0014; G06T 7/521; G06T 2207/30261; G05D 1/0248; G05D 1/0251; G05D 2201/0215; G06V 20/58; G01B 11/026
   See application file for complete search history.

(56) References Cited

U.S. PATENT DOCUMENTS

| | | | | |
|---|---|---|---|---|
| 11,550,054 | B2* | 1/2023 | Alexandrov | G01S 17/931 |
| 11,691,264 | B2* | 7/2023 | Wang | G06T 7/70 |
| | | | | 345/166 |
| 2002/0181240 | A1* | 12/2002 | Holz | B60Q 1/14 |
| | | | | 362/487 |
| 2013/0238183 | A1* | 9/2013 | Goulding | B25J 9/1633 |
| | | | | 701/26 |
| 2014/0036062 | A1* | 2/2014 | Yoon | G01V 8/10 |
| | | | | 348/118 |
| 2015/0168954 | A1* | 6/2015 | Hickerson | G01S 17/89 |
| | | | | 901/1 |
| 2015/0174981 | A1* | 6/2015 | Buma | B60G 17/0182 |
| | | | | 348/148 |
| 2015/0265125 | A1* | 9/2015 | Lee | A47L 11/4066 |
| | | | | 701/26 |
| 2016/0101524 | A1 | 4/2016 | Noh et al. | |
| 2016/0378117 | A1* | 12/2016 | Szatmary | G06V 10/145 |
| | | | | 382/153 |
| 2017/0261985 | A1* | 9/2017 | Maeno | G05D 1/0246 |
| 2017/0332872 | A1* | 11/2017 | Jun | G06T 7/521 |
| 2017/0336796 | A1 | 11/2017 | Jun et al. | |
| 2019/0179016 | A1* | 6/2019 | Raring | G01S 7/4817 |
| 2020/0371526 | A1* | 11/2020 | Kamada | G01S 17/04 |
| 2021/0212541 | A1* | 7/2021 | Sung | G01B 11/026 |
| 2021/0361132 | A1* | 11/2021 | Sung | G05D 1/0214 |
| 2023/0116867 | A1* | 4/2023 | Xing | A47L 11/4002 |
| | | | | 701/28 |

FOREIGN PATENT DOCUMENTS

| | | |
|---|---|---|
| CN | 107194970 | 9/2017 |
| EP | 2869156 | 5/2015 |
| EP | 2980670 | 2/2016 |
| JP | H10-83446 | 3/1998 |
| JP | 2014-048842 | 3/2014 |
| JP | 2017-167601 | 9/2017 |
| KR | 10-2009-0098513 | 9/2009 |
| KR | 10-2010-0098997 | 9/2010 |
| KR | 10-1412751 | 8/2014 |
| KR | 10-2015-0065972 | 6/2015 |
| KR | 10-1542498 | 8/2015 |
| KR | 10-2015-0109598 | 10/2015 |
| KR | 10-1620428 | 5/2016 |
| WO | WO-2016005011 A1 * | 1/2016 ........... G05D 1/0248 |

OTHER PUBLICATIONS

European Search Report dated Feb. 3, 2022 issued in Application 19804285.5.
Chinese Office Action dated Jun. 11, 2021 issued in Application No. 201980032008.7 (English translation attached).

* cited by examiner

CAPTURED IMAGE

CAPTURED IMAGE

VACUUM CLEANER AND CONTROL METHOD THEREOF

CROSS-REFERENCE TO RELATED PATENT APPLICATIONS

This application is a U.S. National Stage Application under 35 U.S.C. § 371 of PCT Application No. PCT/KR2019/005862, filed May 16, 2019, which claims priority to Korean Patent Application No. 10-2018-0056135, filed May 16, 2018, whose entire disclosures are hereby incorporated by reference.

TECHNICAL FIELD

The present disclosure relates to a cleaner and a method for controlling the same, and more particularly, to a cleaner capable of recognizing an obstacle and performing autonomous traveling, and a method for controlling the same.

BACKGROUND ART

In general, robots have been developed for industrial use and have been partially in charge of factory automation. In recent years, the field of application of robots has been expanded, and medical robots, aerospace robots, and the like have been developed, and household robots that can be used in ordinary homes have also been made.

A representative example of the home robot is a robot cleaner, which is a type of household appliance that sucks and cleans dust or foreign materials around the robot while autonomously traveling in a predetermined area. Such a robot cleaner is generally equipped with a rechargeable battery and an obstacle sensor for avoiding obstacles during traveling. Such structure allows the robot cleaner to perform cleaning while traveling by itself.

In recent years, research have been actively carried out to utilize the robot cleaner in various fields such as health care, smart home, remote control, and the like, instead of merely performing cleaning by autonomously traveling in a cleaning area.

Meanwhile, the robot cleaner may capture a front side while irradiating predetermined light to a floor area, to acquire an image including a light pattern formed on the floor area or an obstacle by the irradiated light.

The robot cleaner may detect a light pattern using the image, detect an obstacle using the detected light pattern, and travel to pass or avoid the detected obstacle.

However, when a light pattern is used, it is difficult for the robot cleaner to recognize the light pattern depending on the material of the floor area. For example, when the floor area absorbs light or direct sunlight is strong around the floor area, a problem occurs in that an image including a light pattern cannot be captured by the camera of the robot cleaner.

DISCLOSURE

Technical Problem

One aspect of the present disclosure is to provide an autonomous cleaner (or self-driving cleaner), capable of enhancing accuracy of obstacle recognition using a light pattern, and a method for controlling the same.

Another aspect of the present disclosure is to provide an autonomous cleaner, capable of performing optimized avoidance travel according to characteristics of a light pattern, and a method for controlling the same.

Technical Solution

To achieve these and other advantages and in accordance with the purpose of the present invention, as embodied and broadly described herein, there is provided a self-driving cleaner including, a main body traveling through a cleaning area and sucking foreign substances from a floor in the cleaning area, a drive unit for moving the main body in the cleaning area, a pattern irradiation unit, disposed on a front surface of the main body, for irradiating light in a predetermined pattern toward a lower front side of the main body, a camera, disposed on the front surface of the main body, for photographing the front of the main body, and a controller for detecting a light pattern formed by the pattern irradiation unit using an image photographed by the camera, determining whether an obstacle exists in front of the main body on the basis of brightness of the detected light pattern, and controlling the drive unit to pass or avoid the obstacle on the basis of a result of the determination.

In one implementation, the controller may control the drive unit to reduce a moving speed of the main body when the brightness of the detected light pattern is less than or equal to a preset reference brightness.

In one implementation, the cleaner may further include a laser sensor configured to detect information related to a material of the floor, and the controller may variably set the reference brightness based on an output of the laser sensor.

In one implementation, the laser sensor may emit predetermined laser beams to the floor, and receive the laser beams reflected from the floor. The controller may increase the reference brightness as an amount of laser beams received by the laser sensor decreases.

In one implementation, the controller may compare a position at which the light pattern is detected with a reference position set in the image, and variably set the reference brightness based on a result of the comparison.

In one implementation, the controller may increase the reference brightness when the light pattern with brightness less than or equal to the reference brightness is located above the reference position.

In one implementation, the controller may variably set the reference brightness based on information related to a form of the light pattern.

In one implementation, the information related to the form of the light pattern may include information related to at least one of a thickness, shape, size, and length of the light pattern.

In one implementation, the controller may variably set the reference brightness based on a number of light patterns included in the image.

In one implementation, the controller may increase the reference brightness when a plurality of light patterns exists in the image.

In one implementation, the plurality of light patterns may include a first light pattern and a second light pattern. The first light pattern may be located to correspond to a reference position set in the image, and the second light pattern may be located above the reference position. The controller may control the drive unit to reduce the moving speed of the main body when brightness of the second light pattern is less than the reference brightness.

In one implementation, the controller may variably set the reference brightness based on an angle formed between a line segment formed by the light pattern and a reference line set in the image.

In one implementation, the controller may increase the reference brightness when the angle is equal to or greater than a preset limit angle.

In one implementation, the controller may control the drive unit to reduce the moving speed of the main body when any light pattern is not detected in the image.

Advantageous Effects

According to the present disclosure, an obstacle recognition method using light patterns can variously be set according to the material of a floor, thereby reducing the probability of erroneous detection of an obstacle due to a cleaning area or an external environment. In addition, according to the present disclosure, since the probability of the erroneous detection of the obstacle is reduced, a cleaning time can also be shortened.

Further, according to the present disclosure, even when it is difficult to accurately detect an obstacle due to an external environment, a collision with such obstacle can be prevented.

MODES FOR CARRYING OUT THE PREFERRED IMPLEMENTATIONS

Hereinafter, description will be given in detail of implementations disclosed herein. Technical terms used in this specification are merely used for explaining specific implementations, and should not be constructed to limit the scope of the technology disclosed herein.

Figure 1:
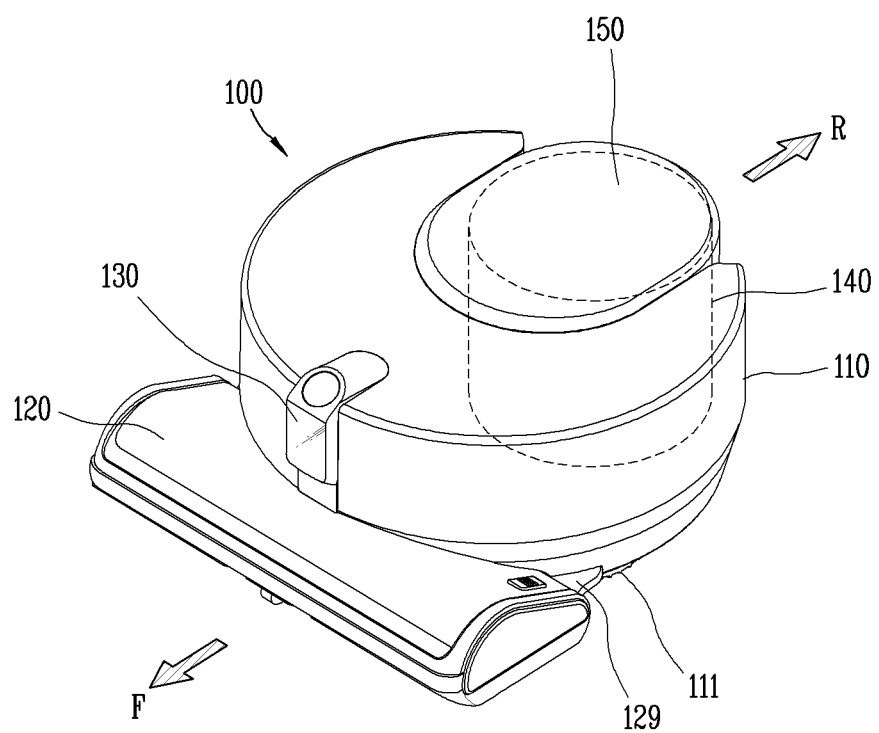
FIG. 1 is a perspective view illustrating an example of a cleaner that performs autonomous traveling according to the present disclosure.
Figure 2:
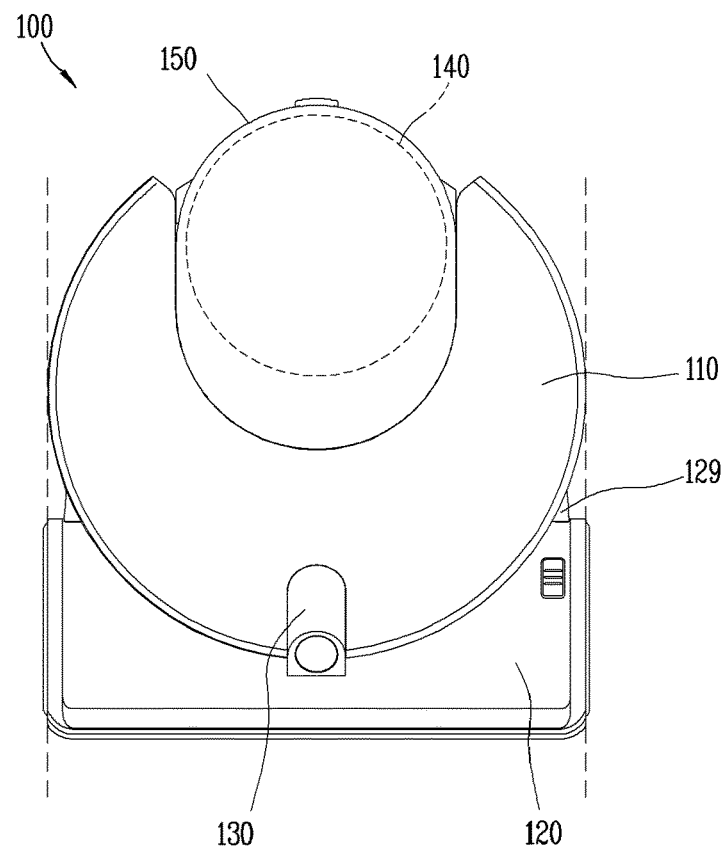
FIG. 2 is a planar view illustrating the cleaner that performs autonomous traveling illustrated in FIG. 1.
Figure 3:
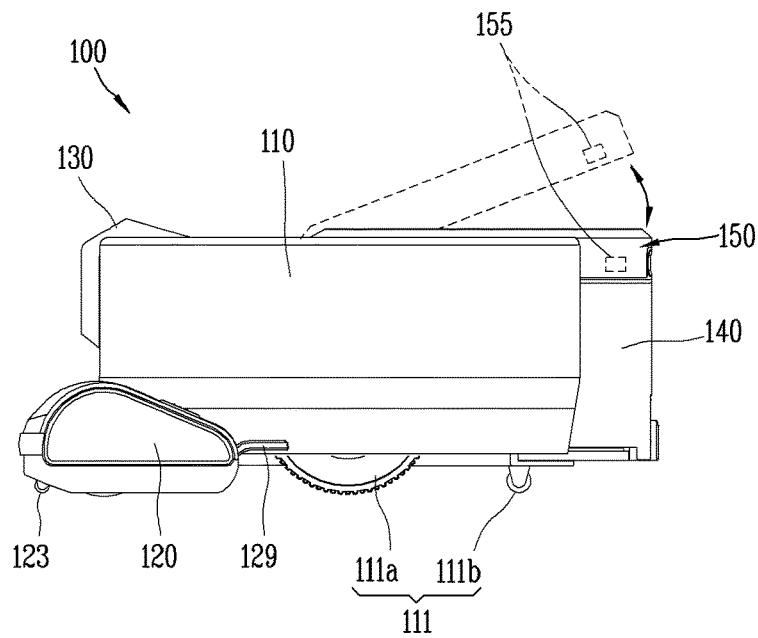
FIG. 3 is a lateral view illustrating the cleaner that performs autonomous traveling illustrated in FIG. 1.

FIG. 1 is a perspective view illustrating one implementation of a robot cleaner 100 according to the present invention, FIG. 2 is a planar view of the robot cleaner 100 illustrated in FIG. 1, and FIG. 3 is a lateral view of the robot cleaner 100 illustrated in FIG. 1.

For reference, in this specification, a mobile robot, a robot cleaner, and a cleaner that performs autonomous traveling may be used in the same sense.

Referring to FIGS. 1 to 3, a robot cleaner 100 performs a function of cleaning a floor while traveling on a predetermined area by itself. Cleaning of a floor mentioned here includes sucking dust (including foreign matter) on the floor or mopping the floor.

The robot cleaner 100 includes a cleaner body 110, a suction unit 120, a sensing unit 130, and a dust container 140.

The cleaner body 110 is provided with a control unit (or controller, not shown) for the control of the robot cleaner 100 and a wheel unit 111 for the traveling of the robot cleaner 100. The robot cleaner 100 may move forward, backward, leftward and rightward by the wheel unit 111.

The wheel unit 111 includes main wheels 111a and a sub wheel 111b.

The main wheels 111a are provided on both sides of the cleaner body 110 and configured to be rotatable in one direction or another direction according to a control signal of the control unit. Each of the main wheels 111a may be configured to be driven independently of each other. For example, each main wheel 111a may be driven by a different motor.

The sub wheel 111b supports the cleaner main body 110 together with the main wheels 111a and assists the traveling of the robot cleaner 100 by the main wheels 111a. The sub wheel 111b may also be provided on a suction unit 120 to be described later.

As described above, the control unit is configured to control the traveling of the wheel unit 111 in such a manner that the robot cleaner 100 autonomously travels on the floor.

Meanwhile, a battery (not shown) for supplying power to the robot cleaner 100 is mounted on the cleaner body 110. The battery may be configured to be rechargeable, and configured to be detachable from a bottom portion of the cleaner body 110.

The suction unit 120 is disposed to protrude from one side of the cleaner main body 110 so as to suck air containing dust. The one side may be a side on which the cleaner body 110 travels in a forward direction (F), that is, a front side of the cleaner body 110.

In the present drawing, it is shown that the suction unit 120 is protruded from one side of the cleaner body 110 to a front side and both left and right sides thereof. Specifically, a front end portion of the suction unit 120 is disposed at a position spaced forward apart from the one side of the cleaner main body 110, and left and right end portions of the suction unit 120 are disposed at positions spaced apart from the one side of the cleaner main body 110 in the right and left directions.

As the cleaner main body 110 is formed in a circular shape and both sides of a rear end portion of the suction unit 120 protrude from the cleaner main body 110 to both left and right sides, empty spaces, namely, gaps may be formed between the cleaner main body 110 and the suction unit 120. The empty spaces are spaces between both left and right end portions of the cleaner main body 110 and both left and right end portions of the suction unit 120 and each has a shape recessed into the robot cleaner 100.

If an obstacle is caught in the empty space, the robot cleaner 100 may be likely to be unmovable due to the obstacle. In order to prevent this, a cover member 129 may be disposed to cover at least part of the vacant space. The cover member 129 may be provided on the cleaner main body 110 or the suction unit 120. In this implementation of the present disclosure, the cover member 129 protrudes from each of both sides of the rear end portion of the suction unit 120 and covers an outer circumferential surface of the cleaner main body 110.

The cover member 129 is disposed to fill at least part of the empty space, that is, the empty space between the cleaner main body 110 and the suction unit 120. Therefore, it may be possible to implement a structure capable of preventing an obstacle from being caught in the vacant space, or being easily released from the obstacle even when the obstacle is caught in the vacant space.

The cover member 129 protruding from the suction unit 120 may be supported on the outer circumferential surface of the cleaner main body 110. The cover member 129 may be supported on a rear portion of the suction unit 120 if the cover member 129 protrudes from the cleaner main body 110. According to this structure, when the suction unit 120 is impacted due to colliding with an obstacle, a part of the impact is transferred to the cleaner main body 110 so as to be dispersed.

The suction unit 120 may be detachably coupled to the cleaner main body 110. When the suction unit 120 is detached from the cleaner main body 110, a mop module (not shown) may be detachably coupled to the cleaner main body 110 in place of the detached suction unit 120. Accordingly, the user can mount the suction unit 120 on the cleaner main body 110 when the user wishes to remove dust on the floor, and may mount the mop module on the cleaner main body 110 when the user wants to mop the floor.

When the suction unit 120 is mounted on the cleaner main body 110, the mounting may be guided by the cover member 129 described above. That is, as the cover member 129 is disposed to cover the outer circumferential surface of the cleaner main body 110, a relative position of the suction unit 120 with respect to the cleaner main body 110 may be determined.

A sensing unit 130 is disposed in the cleaner body 110. As illustrated, the sensing unit 130 may be disposed on one side of the cleaner main body 110 where the suction unit 120 is located, that is, on a front side of the cleaner main body 110.

The sensing unit 130 may be disposed to overlap the suction unit 120 in an up and down direction of the cleaner main body 110. The sensing unit 130 is disposed at an upper portion of the suction unit 120 so as to detect an obstacle or feature in front of the robot so that the suction unit 120 positioned at the forefront of the robot cleaner 100 does not hit the obstacle.

The sensing unit 130 is configured to additionally perform another sensing function in addition to the sensing function. This will be described in detail later.

The cleaner main body 110 is provided with a dust container accommodating portion. The dust container 140 in which dust separated from the sucked air is collected is detachably coupled to the dust container accommodating portion. As illustrated in the drawing, the dust container accommodation portion 113 may be formed on the other side of the cleaner body 110, namely, behind the cleaner body 110.

A part of the dust container 140 is accommodated in the dust container accommodation portion 113 and another part of the dust container 140 is formed to protrude toward a rear side of the cleaner body 110 (i.e., a reverse direction (R) opposite to a forward direction (F)).

The dust container 140 is formed with an inlet 140a through which air containing dust is introduced and an outlet 140b through which air separated from dust is discharged, and when the dust container 140 is installed in the dust container accommodation portion 113, the inlet 140a and the outlet 140b are configured to communicate with a first opening 110a and a second opening 110b formed in an inner wall of the dust container accommodation portion 113, respectively.

The intake passage in the cleaner body 110 corresponds to a passage from the inlet port (not shown) communicating with the communicating portion 120b to the first opening 110a, and the discharge passage corresponds to a passage from the second opening 110b to the discharge port 112.

According to such connection, air containing dust introduced through the suction unit 120 flows into the dust container 140 through the intake passage inside the cleaner main body 110 and the air is separated from the dust while passing through a filter and cyclone of the dust container 140. Dust is collected in the dust container 140, and air is discharged from the dust container 140 and then discharged to the outside through the discharge port 112 in the cleaner body 110 and finally through the discharge port 112.

Hereinafter, an implementation related to the components of the robot cleaner 100 will be described with reference to FIG. 4.

A robot cleaner 100 or a mobile robot according to an implementation of the present disclosure may include at least one of a communication unit 1100, an input unit 1200, a driving unit (or drive unit) 1300, a sensing unit 1400, an output unit 1500, a power supply unit 1600, a memory 1700, and a control unit (or controller) 1800, or a combination thereof.

Figure 4:
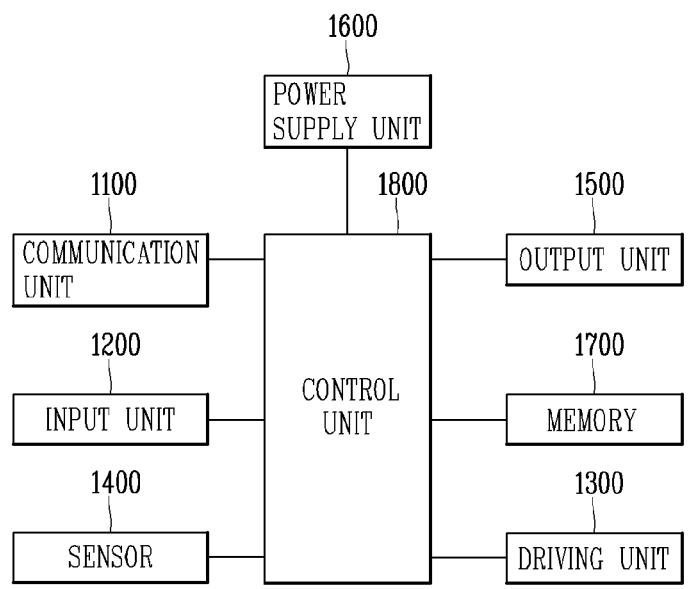
FIG. 4 is a block view illustrating components of a cleaner performing autonomous traveling in accordance with one implementation of the present disclosure.

Here, it is needless to say that the components shown in FIG. 4 are not essential, and thus a robot cleaner having more or fewer components than shown in FIG. 4 may be implemented. Hereinafter, each component will be described.

First, the power supply unit 1600 includes a battery that can be charged by an external commercial power supply, and supplies power to the mobile robot. The power supply unit 1600 supplies driving power to each of the components included in the mobile robot to supply operating power required for the mobile robot to travel or perform a specific function.

Here, the control unit (or controller) 1800 may sense the remaining power of the battery, and control the battery to move power to a charging base connected to the external commercial power source when the remaining power is insufficient, and thus a charge current may be supplied from the charging base to charge the battery. The battery may be connected to a battery sensing portion so that a remaining power level and a charging state can be transmitted to the control unit 1800. The output unit 1500 may display the remaining battery level on a screen under the control of the control unit.

The battery may be located in a bottom portion of a center of the robot cleaner, or may be located in either the left or right side. In the latter case, the mobile robot may further include a balance weight for eliminating a weight bias of the battery.

On the other hand, the driving unit (or drive unit) 1300 may include a motor, and operate the motor to bidirectionally rotate left and right main wheels, so that the main body can rotate or move. The driving unit 1300 may allow the main body of the mobile robot to move forward, backward, leftward and rightward, travel in a curved manner or rotate in place.

On the other hand, the input unit 1200 receives various control commands for the robot cleaner from the user. The input unit 1200 may include one or more buttons, for example, the input unit 1200 may include an OK button, a set button, and the like. The OK button is a button for receiving a command for confirming detection information, obstacle information, position information, and map information from the user, and the setting button is a button for receiving a command for setting those information from the user.

In addition, the input unit 1200 may include an input reset button for canceling a previous user input and receiving a new user input, a delete button for deleting a preset user input, a button for setting or changing an operation mode, a button for receiving an input to return to the charging base, and the like.

In addition, the input unit 1200 may be implemented as a hard key, a soft key, a touch pad, or the like and may be disposed on a top of the mobile robot. For example, the input unit 1200 may implement a form of a touch screen together with the output unit 1500.

On the other hand, the output unit 1500 may be installed on a top of the mobile robot. Of course, the installation position and installation type may vary. For example, the output unit 1500 may display a battery level state, a traveling mode or manner, or the like on a screen.

The output unit 1500 may output internal status information of the mobile robot detected by the sensing unit 1400, for example, a current status of each component included in the mobile robot. The output unit 1500 may also display external status information detected by the sensing unit 1400, obstacle information, position information, map information, and the like on the screen. The output unit 1500 may be configured as one device of a light emitting diode (LED), a liquid crystal display (LCD), a plasma display panel, and an organic light emitting diode (OLED).

The output unit 1500 may further include an audio output module for audibly outputting information related to an operation of the mobile robot executed by the control unit 1800 or an operation result. For example, the output unit 1500 may output a warning sound to the outside in accordance with a warning signal generated by the control unit 1800.

Here, the sound output device may be a device for outputting sound such as a beeper, a speaker, or the like, and the output unit 1500 may output the sound to the outside through the sound output device using audio data or message data having a predetermined pattern stored in the memory 1700.

Accordingly, the mobile robot according to one implementation of the present disclosure can output environmental information related to a travel area through the output unit 1500 or output the same in an audible manner. According to another implementation, the mobile robot may transmit map information or environmental information to a terminal device through the communication unit 1100 so that the terminal device outputs a screen to be output through the output unit 1500 or sounds.

On the other hand, the communication unit 1100 is connected to the terminal device and/or another device (mixed with term "home appliance" in this specification) located in a specific area in one of wired, wireless, satellite communication methods to transmit and receive signals and data.

The communication unit 1100 may transmit and receive data with another located in a specific area. In this case, the another device may be any device if it can transmit and receive data through a network. For example, the another device may be an air conditioner, a heating device, an air purifier, a lamp, a TV, a vehicle, and the like. The another device may also be a device for controlling a door, a window, a water supply valve, a gas valve, or the like. The another device may also be a sensor for detecting temperature, humidity, air pressure, gas, or the like.

The memory 1700 stores a control program for controlling or driving the robot cleaner and data corresponding thereto. The memory 1700 may store audio information, image information, obstacle information, position information, map information, and the like. Also, the memory 1700 may store information related to a traveling pattern.

The memory 1700 mainly uses a nonvolatile memory. Here, the non-volatile memory (NVM, NVRAM) is a storage device that can continuously store information even when power is not supplied. Examples of the storage device include a ROM, a flash memory, a magnetic computer storage device (e.g., a hard disk, a diskette drive, a magnetic tape), an optical disk drive, a magnetic RAM, a PRAM, and the like.

Meanwhile, the sensing unit 1400 may include at least one of an impact sensor, an external signal detection sensor, a front detection sensor, a cliff detection sensor, a lower camera sensor, an upper camera sensor and a three-dimensional camera sensor.

The impact sensor may be provided at at least one point on an outer surface of the main body, and may sense a physical force applied to the point.

In one example, the impact sensor may be disposed on the outer surface of the main body to be directed toward the front of the main body. In another example, the impact sensor may be disposed on the outer surface of the body to be directed to the rear of the body. In another example, the impact sensor may be disposed on the outer surface of the main body to be directed toward the left or right side of the main body.

The external signal sensor or external signal detection sensor may sense an external signal of the mobile robot. The external signal detection sensor may be, for example, an infrared ray sensor, an ultrasonic sensor, a radio frequency (RF) sensor, or the like.

The mobile robot may detect a position and direction of the charging base by receiving a guidance signal generated by the charging base using the external signal sensor. At this time, the charging base may transmit a guidance signal indicating a direction and distance so that the mobile robot can return thereto. That is, the mobile robot may determine a current position and set a moving direction by receiving a signal transmitted from the charging base, thereby returning to the charging base.

On the other hand, the front sensors or front detection sensors may be installed at a predetermined distance on the front of the mobile robot, specifically, along a circumferential surface of a side surface of the mobile robot. The front sensor is located on at least one side surface of the mobile robot to detect an obstacle in front of the mobile robot. The front sensor may detect an object, especially an obstacle, existing in a moving direction of the mobile robot and transmit detection information to the control unit 1800. That is, the front sensor may detect protrusions on the moving path of the mobile robot, household appliances, furniture, walls, wall corners, and the like, and transmit the information to the control unit 1800.

For example, the frontal sensor may be an infrared ray (IR) sensor, an ultrasonic sensor, an RF sensor, a geomagnetic sensor, or the like, and the mobile robot may use one type of sensor as the front sensor or two or more types of sensors if necessary.

For an example, the ultrasonic sensors may be mainly used to sense a distant obstacle in general. The ultrasonic sensor may be provided with a transmitter and a receiver. The control unit 1800 may determine presence or non-presence of an obstacle according to whether ultrasonic waves radiated from the transmitter are reflected by an obstacle or the like and then received by the receiver, and calculate a distance from the obstacle using an ultrasonic wave radiation time and an ultrasonic wave reception time.

Furthermore, the control unit 1800 may compare ultrasonic waves emitted from the transmitter and ultrasonic waves received at the receiver to detect information related to a size of the obstacle. For example, the control unit 1800 may determine that the obstacle is larger in size when more ultrasonic waves are received in the receiver.

In one implementation, a plurality of (for example, five) ultrasonic sensors may be provided along a lateral outer circumferential surface at a front side of the mobile robot. At this time, the ultrasonic sensors may preferably be installed on the front surface of the mobile robot in a manner that the transmitter and the receiver are alternately arranged.

That is, the transmitters may be disposed at right and left sides with being spaced apart from a front center of the main body or one transmitter or at least two transmitters may be disposed between the receivers so as to form a reception area of an ultrasonic signal reflected from an obstacle or the like. With this arrangement, the reception area can increase while reducing the number of sensors. A radiation angle of ultrasonic waves may be maintained in a range of avoiding an affection to different signals so as to prevent a crosstalk. Furthermore, the receiving sensitivities of the receivers may be set to be different from each other.

In addition, the ultrasonic sensor may be installed upward by a predetermined angle so that the ultrasonic waves emitted from the ultrasonic sensor are output upward. In this instance, the ultrasonic sensor may further include a predetermined blocking member to prevent the ultrasonic waves from being radiated downward.

On the other hand, as described above, the front sensor may be implemented by using two or more types of sensors together, and thus the front sensor may use any one of an IR sensor, an ultrasonic sensor, an RF sensor and the like.

For example, the front sensor may include an IR sensor as another sensor, in addition to the ultrasonic sensor.

The IR sensor may be installed on an outer circumferential surface of the mobile robot together with the ultrasonic sensor. The infrared sensor may also sense an obstacle existing at the front or the side to transmit obstacle information to the control unit 1800. In other words, the infrared sensor may sense a protrusion, a household appliance, a furniture, a wall surface, a wall corner, and the like, on the moving path of the mobile robot to transmit the information to the control unit 1800. Therefore, the mobile robot can move within a specific area without collision with an obstacle.

On the other hand, a cliff sensor (or cliff detection sensor) may detect an obstacle on the floor supporting the main body of the mobile robot by mainly using various types of optical sensors.

That is, the cliff sensor may also be installed on a rear surface of the mobile robot on the floor, but may be installed on a different position depending on a type of the mobile robot. The cliff sensor is located on the rear surface of the mobile robot and detects an obstacle on the floor. The cliff sensor may be an IR sensor, an ultrasonic sensor, an RF sensor, a Position Sensitive Detector (PSD) sensor, and the like, which include a transmitter and a receiver, similar to the obstacle detection sensor.

For an example, any one of the cliff detection sensors may be installed in front of the mobile robot, and the other two cliff detection sensors may be installed relatively behind.

For example, the cliff sensor may be a PSD sensor, but may alternatively be configured by a plurality of different kinds of sensors.

The PSD sensor detects a short/long distance location of incident light at one p-n junction using semiconductor surface resistance. The PSD sensor includes a one-dimensional PSD sensor that detects light only in one axial direction, and a two-dimensional PSD sensor that detects a light position on a plane. Both of the PSD sensors may have a pin photodiode structure. The PSD sensor is a type of infrared sensor that uses infrared rays to transmit infrared rays and then measure an angle of infrared rays reflected from and returned back to an obstacle so as to measure a distance. That is, the PSD sensor calculates a distance from the obstacle by using the triangulation method.

The PSD sensor includes a light emitter that emits infrared rays to an obstacle and a light receiver that receives infrared rays that are reflected and returned from the obstacle, and is configured typically as a module type. When an obstacle is detected by using the PSD sensor, a stable measurement value may be obtained irrespective of reflectivity and color difference of the obstacle.

The control unit 1800 may measure an infrared angle between an emission signal of infrared rays emitted from the cliff detection sensor toward the ground and a reflection signal reflected and received by the obstacle to sense a cliff and analyze the depth thereof.

Meanwhile, the control unit 1800 may determine whether to pass a cliff or not according to a ground state of the detected cliff by using the cliff detection sensor, and decide whether to pass the cliff or not according to the determination result. For example, the control unit 1800 determines presence or non-presence of a cliff and a depth of the cliff through the cliff sensor, and then allows the mobile robot to pass through the cliff only when a reflection signal is detected through the cliff sensor.

As another example, the control unit 1800 may also determine lifting of the mobile robot using the cliff sensor.

On the other hand, the lower camera sensor is provided on the rear surface of the mobile robot, and acquires image information regarding the lower side, that is, the bottom surface (or the surface to be cleaned) during the movement. The lower camera sensor is also referred to as an optical flow sensor in other words. The lower camera sensor converts a lower image input from an image sensor provided in the sensor to generate image data of a predetermined format. The generated image data may be stored in the memory 1700.

Also, at least one light source may be installed adjacent to the image sensor. The one or more light sources irradiate light to a predetermined region of the bottom surface captured by the image sensor. That is, while the mobile robot moves in a specific area along the floor surface, a constant distance is maintained between the image sensor and the floor surface when the floor surface is flat. On the other hand, when the mobile robot moves on a floor surface which is not flat, the image sensor and the floor surface are spaced apart from each other by a predetermined distance due to an unevenness and an obstacle on the floor surface. At this time, the at least one light source may be controlled by the control unit 1800 to adjust an amount of light to be emitted. The light source may be a light emitting device, for example, a light emitting diode (LED), which is capable of adjusting an amount of light.

The control unit 1800 may detect a position of the mobile robot irrespective of slippage of the mobile robot, using the lower camera sensor. The control unit 1800 may compare and analyze image data captured by the lower camera sensor according to time to calculate a moving distance and a moving direction, and calculate a position of the mobile robot based on the calculated moving distance and moving direction. By using the image information regarding the lower side of the mobile robot captured by the lower camera sensor, the control unit 1800 may perform correction that is robust against slippage with respect to the position of the mobile robot calculated by another element.

On the other hand, the upper camera sensor may be installed so as to face upward or forward of the mobile robot to photograph the surroundings of the mobile robot. When the mobile robot includes a plurality of upper camera sensors, the camera sensors may be disposed on the upper or side surface of the mobile robot at predetermined distances or at predetermined angles.

The three-dimensional camera sensor may be attached to one side or a part of the main body of the mobile robot to generate three-dimensional coordinate information related to the surroundings of the main body.

That is, the 3D camera sensor may be a 3D depth camera that calculates a remote/near distance between the mobile robot and an object to be captured.

Specifically, the 3D camera sensor may capture 2D images related to surroundings of the main body, and generate a plurality of 3D coordinate information corresponding to the captured 2D images.

In one implementation, the three-dimensional camera sensor may include two or more cameras that acquire a conventional two-dimensional image, and may be formed in a stereo vision manner to combine two or more images obtained from the two or more cameras so as to generate three-dimensional coordinate information.

Specifically, the three-dimensional camera sensor according to the implementation may include a first pattern irradiation unit for irradiating light with a first pattern in a downward direction toward the front of the main body, and a second pattern irradiation unit for irradiating the light with a second pattern in an upward direction toward the front of the main body, and an image acquisition unit for acquiring an image in front of the main body. As a result, the image acquisition unit may acquire an image of a region where light of the first pattern and light of the second pattern are incident.

In another implementation, the three-dimensional camera sensor may include an infrared ray pattern emission unit for irradiating an infrared ray pattern together with a single camera, and capture the shape of the infrared ray pattern irradiated from the infrared ray pattern emission unit onto the object to be captured, thereby measuring a distance between the sensor and the object to be captured. Such a three-dimensional camera sensor may be an IR (infrared) type three-dimensional camera sensor.

In still another embodiment, the three-dimensional camera sensor may include a light emitting unit that emits light together with a single camera, receive a part of laser emitted from the light emitting unit reflected from the object to be captured, and analyze the received laser, thereby measuring a distance between the three-dimensional camera sensor and the object to be captured. The three-dimensional camera sensor may be a time-of-flight (TOF) type three-dimensional camera sensor.

Specifically, the laser of the above-described three-dimensional camera sensor is configured to irradiate a laser beam in the form of extending in at least one direction. In one example, the 3D camera sensor may be provided with first and second lasers. The first laser irradiates linear laser beams intersecting each other, and the second laser irradiates single linear laser beam. According to this, the lowermost laser is used to detect an obstacle on a bottom, the uppermost laser is used to detect an obstacle on a top, and an intermediate laser between the lowermost laser and the uppermost laser is used to detect an obstacle at a middle portion.

A system including a cleaner that performs autonomous travelling according to an embodiment of the present disclosure will be described below with reference to FIG. 5.

Figure 5:
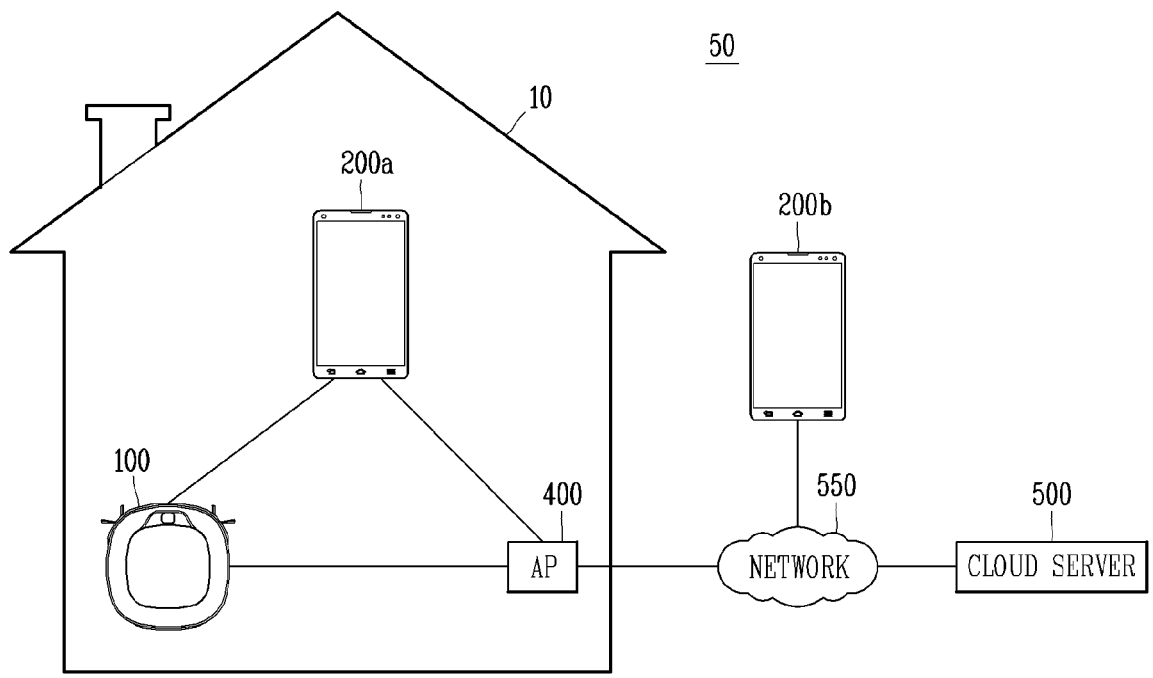
FIG. 5 is a conceptual view illustrating an example in which a cleaner and a charging station according to the present disclosure are installed in a cleaning area.

Referring to FIG. 5, a robot cleaning system 50 according to an embodiment of the present disclosure may include the robot cleaner 100 (or the mobile robot), an access point (AP) device 400, a server 500, a network 550, and mobile terminals 200a and 200b.

The cleaner 100, the AP device 400, the mobile terminal 200a, and the like may be disposed in a building 10 such as a house, while the external mobile terminal 200b and the server may be connected to the AP device 400 by the network 550.

Figure 6:
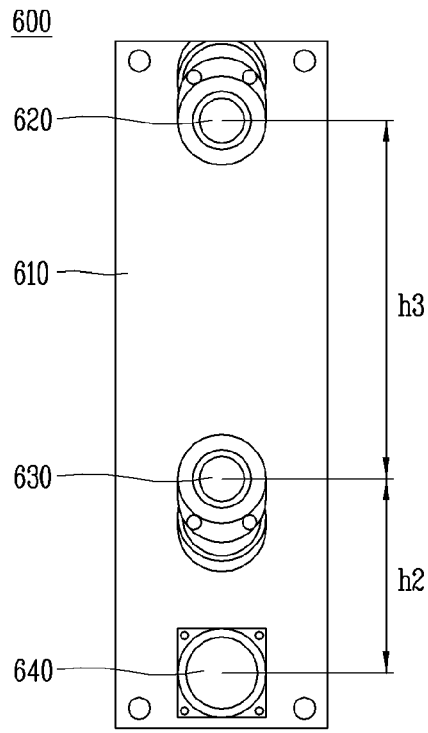
FIGS. 6 and 7 are front and lateral views of an obstacle detection unit.
Figure 7:
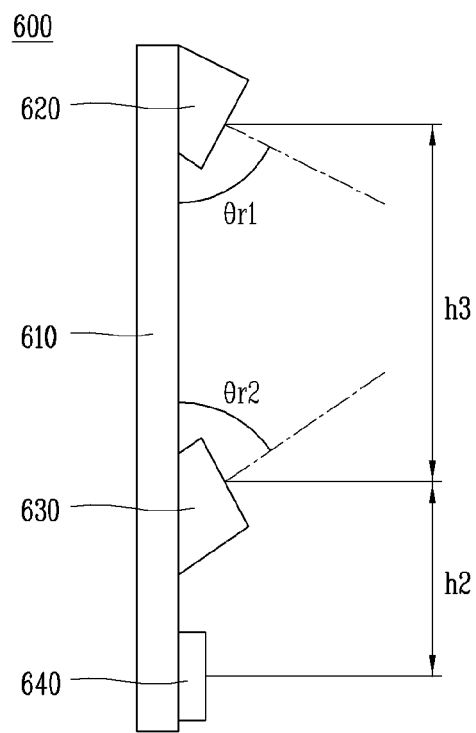
Figure 8:
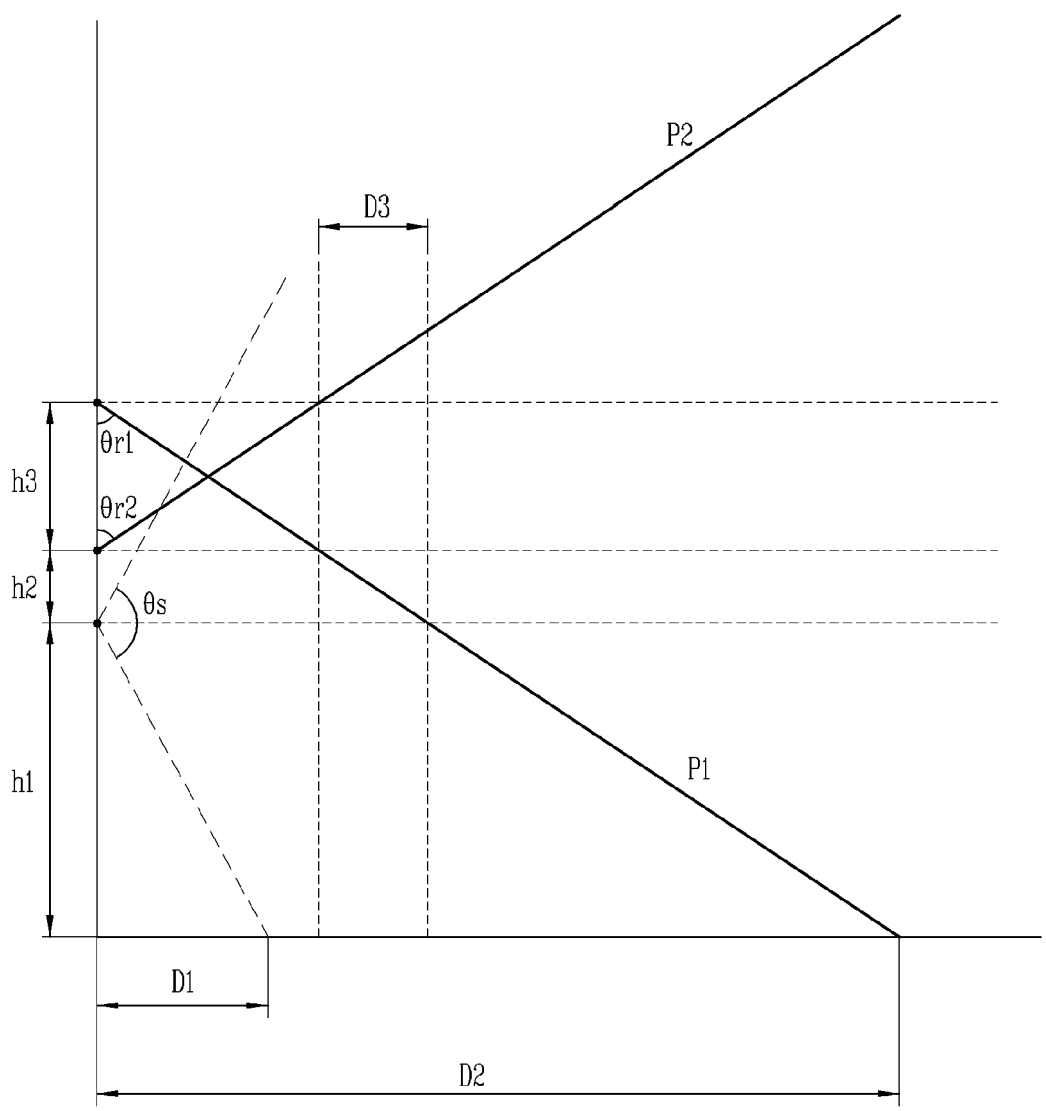
FIG. 8 is a diagram illustrating an irradiation range and an obstacle detection range of the obstacle detection unit.

FIG. 6 is a front view of an obstacle detection unit, and FIG. 7 is a lateral view of the obstacle detection unit. FIG. 8 illustrates an irradiation range and an obstacle detection range of the obstacle detection unit.

As illustrated in FIG. 6, each of first and second pattern irradiation units 620 and 630 of an obstacle detection unit 600 may include a light source and a pattern generator (i.e., an optical pattern projection element (OPPE)) through which light irradiated from the light source is transmitted to generate a predetermined pattern. The light source may be a laser diode (LD), a light emitting diode (LED), or the like. Laser light is superior to other light sources in terms of monochromaticity, straightness, and connection characteristic, and allows precise distance measurement. In particular, infrared or visible light causes great deviation in accuracy of distance measurement depending on factors such as color and material of an object. Therefore, the laser diode is preferable as the light source. The pattern generator may include a diffractive optical element (DOE). Various patterns of light may be irradiated according to the configuration of the pattern generator provided in each of the pattern irradiation units 620 and 630.

The first pattern irradiation unit 620 may irradiate a first pattern of light (hereinafter, referred to as first pattern light) P1 toward a front lower side of a main body 110. Accordingly, the first pattern light P1 may be incident on the floor of the cleaning area.

The first pattern light P1 may be formed in the shape of a horizontal line Ph. In addition, the first pattern light P1 may be formed in the shape of a cross pattern in which the horizontal line Ph and a vertical line Pv intersect with each other.

The first pattern irradiation unit 620, the second pattern irradiation unit 630, and an image acquisition unit 640 may be vertically arranged in a row. The image acquisition unit 640 may be disposed below the first pattern irradiation unit 620 and the second pattern irradiation unit 630, but the present disclosure may not be limited thereto. The image acquisition unit may alternatively be disposed above the first pattern irradiation unit and the second pattern irradiation unit.

In an implementation, the first pattern irradiation unit 620 may be located at a top to irradiate the first pattern light P1 toward the front lower side, so as to detect an object located below it. The second pattern irradiation unit 630 may be located below the first pattern irradiation unit 620 to irradiate a second pattern of light (hereinafter, referred to as second pattern light) P2 toward the front upper side. Accordingly, the second pattern light P2 may be incident on an obstacle or a specific portion of the obstacle that is located higher than at least the second pattern irradiation unit 630 from a wall or the floor of the cleaning area.

The second pattern light P2 may be a different pattern from the first pattern light P1, and preferably include a horizontal line. Here, the horizontal line does not necessarily have to be a continuous line segment, but may be a dotted line.

An irradiation angle θh indicates a horizontal irradiation angle of the first pattern light P1 irradiated from the first pattern irradiation unit 620. The irradiation angle indicates an angle that both ends of the horizontal line Ph form with the first pattern irradiation unit 620 and is preferably set in the range of 130° to 140°. However, the present disclosure may not be necessarily limited thereto.

Like the first pattern irradiation unit 620, the horizontal irradiation angle of the second pattern irradiation unit 630 may preferably be set in the range of 130° to 140°. Depending on implementations, the second pattern irradiation unit 630 may irradiate the second pattern light P2 at the same horizontal irradiation angle as that of the first pattern irradiation unit 620.

The image acquisition unit 640 may acquire an image of the front of the main body 110. In particular, the pattern lights P1 and P2 appear in images acquired by the image acquisition unit 640 (hereinafter, referred to as acquired images). Hereinafter, images of the pattern lights P1 and P2 appearing in the acquired images are referred to as light patterns. Since the light patterns are substantially images that the pattern lights P1 and P2 incident on a real space are projected on an image sensor, the same reference numerals as the pattern lights P1 and P2 are given to the light patterns. Thus, the images corresponding to the first pattern light P1 and the second pattern light P2 are referred to as a first light pattern P1 and a second light pattern P2.

The image acquisition unit 640 may include a digital camera that converts an image of a subject to be captured into an electrical signal and then converts it into a digital signal to store in a memory device. The digital camera may include an image sensor (not shown) and an image processing unit (not shown).

An image sensor may be an apparatus for converting an optical image into an electrical signal. The image sensor may be configured as a chip on which a plurality of photo diodes is integrated, and the photo diode may be a pixel, for example. Electric charges are accumulated in the respective pixels by an image, which is formed on the chip by light passing through a lens, and the electric charges accumulated in the pixels are converted into an electrical signal (for example, voltage). Charge Coupled Device (CCD), Complementary Metal Oxide Semiconductor (CMOS), and the like are well known as image sensors.

The image processing unit may generate a digital image based on an analog signal output from the image sensor. The image processing unit may include an AD converter for converting an analog signal into a digital signal, a buffer memory for temporarily recording digital data according to the digital signal output from the AD converter, and a digital signal processor (DSP) for creating a digital image by processing information recorded in the buffer memory.

The control unit may detect features such as points, lines, and planes for predetermined pixels constituting an acquired image, and detect the light pattern P1, P2 or points, lines, and planes constituting the light pattern P1, P2 based on the detected features.

For example, the control unit may extract line segments that are constructed by consecutive pixels brighter than surroundings, and extract a horizontal line Ph constituting the first light pattern P1 and a horizontal line constituting the second light pattern P2.

However, the present disclosure may not be limited thereto. Since various techniques for extracting patterns of desired shapes from digital images are already known, the control unit may alternatively extract the first light pattern P1 and the second light pattern P2 using those already-known techniques.

As illustrated in FIG. 8, the first pattern irradiation unit 620 and the second pattern irradiation unit 630 may be symmetrically disposed. The first pattern irradiation unit 620 and the second pattern irradiation unit 630 may be disposed vertically apart by a distance h3. Accordingly, the first pattern irradiation unit may irradiate the first pattern light downward, and the second pattern irradiation unit may irradiate the second pattern light upward, so that the pattern lights intersect with each other.

The image acquisition unit 640 may be located below the second pattern irradiation unit by a distance h2 and capture the front images of the main body 110 at a viewing angle θs in the vertical direction. The image acquisition unit 640 may be installed at a distance h1 from the floor. The image acquisition unit 640 may preferably be installed at position where it does not interfere with capturing the front, considering a bumper (not shown) constructing a lower end of the front portion of the main body 110 of the mobile robot or a shape of a structure for traveling or cleaning.

The first pattern irradiation unit 620 or the second pattern irradiation unit 630 may be installed such that a direction in which an optical axis of a lens constituting the first or second pattern irradiation unit 620 or 630 is directed forms a predetermined irradiation angle.

The first pattern irradiation unit 620 may irradiate the first pattern light P1 downward at a first irradiation angle θr1, and the second pattern irradiation unit 630 may irradiate the second pattern light P2 at a second irradiation angle θr2. In this case, the first irradiation angle and the second irradiation angle may basically be different from each other, but may alternatively be set to be the same in some cases. The first and second irradiation angles may preferably be determined in the range of 50° to 75°, but may not be necessarily limited thereto. For example, the first irradiation angle may be set to 60° to 70° and the second irradiation angle may be set to 50° to 55°. The irradiation angles may vary depending on the structure of a lower bumper of the mobile robot, a detected distance from a lower object, or a height of an upper part to be detected.

When the pattern light irradiated from the first pattern irradiation unit 620 and/or the second pattern irradiation unit 630 is incident on an obstacle, the position of the light pattern P1, P2 may differ in an acquired image depending on a distance by which the obstacle is spaced apart from the first pattern irradiation unit 620. For example, in case where the first pattern light P1 and the second pattern light P2 are incident on a predetermined obstacle, the first light pattern P1 in an acquired image may be displayed at a higher position while the second light pattern P2 in the acquired image may be displayed at a lower position when the obstacle is located close to the mobile robot. That is, distance data to an obstacle that corresponds to a row constituting an image generated by the image acquisition unit 640 (i.e., a line including pixels arranged in a horizontal direction) may be stored in advance. When the light patterns P1 and P2 detected in the image acquired by the image acquisition unit 640 are detected in a predetermined row, the position of the obstacle may be estimated from distance data to the obstacle corresponding to the row.

The image acquisition unit 640 may be aligned so that an optical axis of the lens is directed in a horizontal direction. θs illustrated in FIG. 8 denotes a viewing angle of the image acquisition unit 640 and may be set to a value of 100° or greater, preferably, 100° to 110°, but is not necessarily limited thereto.

In addition, a distance from the floor of the cleaning area to the image acquisition unit 640 may be determined approximately between 60 mm to 70 mm. In this case, the floor of the cleaning area in the image acquired by the image acquisition unit 640 may appear after D1 from the image acquisition unit. D2 denotes a position at which the first light pattern P1 is displayed on the floor appearing in the acquired image. In this case, when an obstacle is located at D2, an image in which the first pattern light P1 is incident on the obstacle may be obtained by the image acquisition unit 640. When the obstacle is closer to the mobile robot than D2, the first light pattern may be displayed above a reference position ref1 in response to the incident first pattern light P1.

Here, the distance from the main body 110 to D1 may preferably be in the range of 100 mm to 150 mm, and the distance from the main body 110 to D2 may preferably be in the range of 180 mm to 280 mm, but the present disclosure may not be limited thereto. On the other hand, D3 denotes a distance from the most protruding portion of the front of the main body to a position on which the second pattern light is incident. Since the main body detects an obstacle while moving, D3 is a minimum distance for detecting an obstacle located at the front (upper part) without colliding with the obstacle. D3 may be set to approximately 23 mm to 30 mm.

On the other hand, the image acquisition unit 640 (or obstacle information acquisition unit) may determine that there is a cliff near the mobile robot when the first light pattern P1 present in an acquired image disappears in a normal state or the first light pattern is partially displayed while the main body 110 moves.

When the first light pattern is not displayed in the acquired image, the image acquisition unit 640 may recognize a cliff positioned in front of the mobile robot. When a cliff (for example, a staircase) exists in front of the mobile robot, since the first pattern light is not incident on the floor, the first light pattern P1 may disappear from the acquired image.

Based on the length of D2, the image acquisition unit 640 may determine that there is a cliff at D2 ahead of the main body 110. In this case, when the first pattern light P1 has a cross shape, a horizontal line may disappear and only a vertical line may be displayed. According to this, the image acquisition unit 640 may determine the presence of the cliff.

Further, when a part of the first light pattern is not displayed, the image acquisition unit 640 may determine that a cliff exists on the left or right side of the mobile robot. When a right part of the first light pattern is not displayed, it may be determined that a cliff exists on the right.

Accordingly, the control unit may control the driving unit 1300, based on information related to the cliff recognized by the image acquisition unit 640, so that the mobile robot travels along a path to avoid the cliff.

In addition, when there is a cliff in front of the mobile robot, the control unit 1800 may control the mobile robot to move forward by a predetermine distance, for example, D2 or less, to redetermine whether there is a cliff by using the cliff sensor disposed on the lower portion of the main body. The mobile robot may firstly check the presence of the cliff through the acquired image, and secondly check the presence of the cliff using the cliff sensor by moving ahead by a predetermined distance.

FIGS. 9A to 9E are views illustrating the pattern light irradiated by the first pattern irradiation unit.

The control unit may detect a first light pattern or a second light pattern from an acquired image input from the image acquisition unit 640 and analyze the first light pattern or the second light pattern detected from the acquired image. In particular, the control unit may determine whether there is an obstacle by comparing the position of the first light pattern with a predetermined reference position ref1.

Figure 9A:
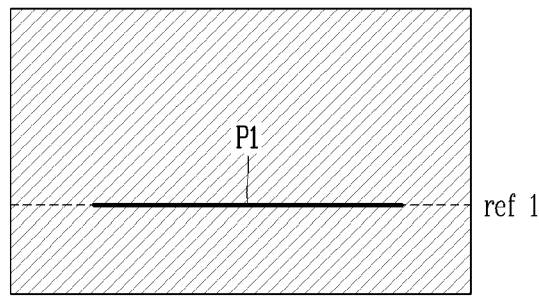
FIGS. 9A to 9E are views illustrating a pattern of light irradiated by a first pattern irradiation unit.

As illustrated in FIG. 9A, when the horizontal line of the first light pattern P1 is located at the reference position ref1, it may be determined as a normal state. Here, the normal state may be a state in which the mobile robot can continuously travel because the floor is level, even and flat and any obstacle is not present at the front.

Since the second light pattern P2 is incident on an obstacle and appears in an acquired image when the obstacle is present above the front, it is general that the second light pattern P2 does not appear in the normal state.

Figure 9B:
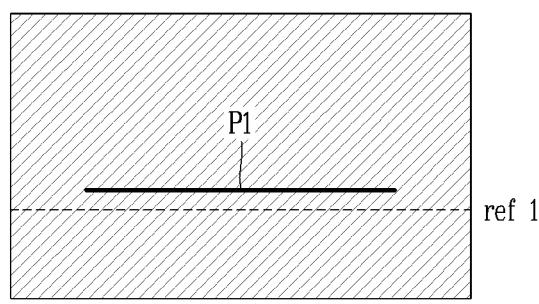

As illustrated in FIG. 9B, when the horizontal line of the first light pattern P1 is located above the reference position ref1, the control unit 1800 may determine that an obstacle exists at the front.

When the obstacle is detected, the control unit 1800 may control the driving unit 1300 such that the mobile robot travels while avoiding the obstacle. Meanwhile, the control unit 1800 may determine position and size of the detected obstacle, in response to determination of the positions of the first and second light patterns P1 and P2 and display or non-display of the second light pattern. In addition, the control unit 1800 may determine the position and size of the obstacle, in response to changes in the first and second light patterns displayed in the acquired image while traveling.

The control unit 1800 may determine whether to keep traveling along the detected obstacle or to travel by avoiding the obstacle based on information related to the detected obstacle, and control the driving unit 1300 based on the determination result. For example, the control unit 1800 may determine that the mobile robot can keep traveling when a height of the obstacle is lower than a predetermined height or the mobile robot enters a space between the obstacle and the floor.

Figure 9C:
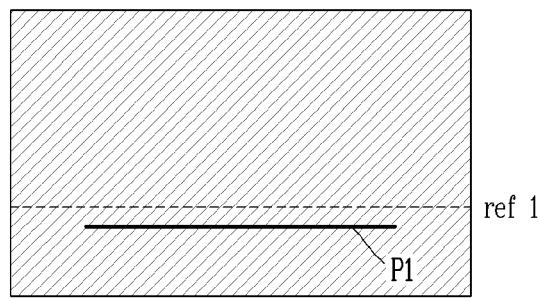

As illustrated in FIG. 9C, the first light pattern P1 may be displayed at a position lower than the reference position ref1. When the first light pattern P1 appears at the position lower than the reference position, the control unit 1800 may determine that a downhill exists. The downhill may be distinguished from a cliff because the first light pattern P1 disappears when the cliff exists.

Figure 9D:
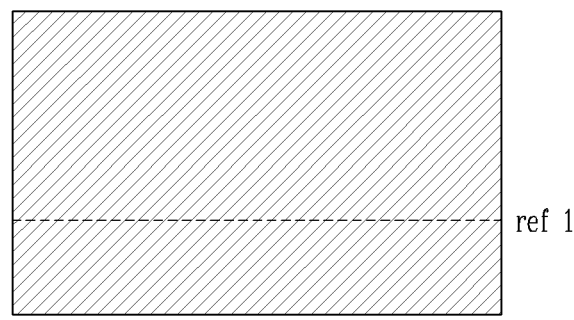

As illustrated in FIG. 9D, when the first light pattern is not displayed, the control unit 1800 may determine that a cliff exists in the traveling direction.

Figure 9E:
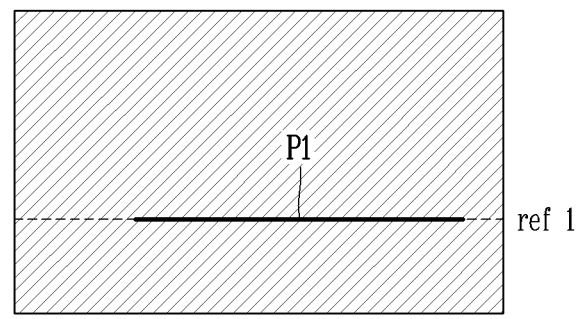

In addition, as illustrated in FIG. 9E, when a part of the first light pattern is not displayed, the image acquisition unit 640 may determine that a cliff exists on the left or right. In this case, the image acquisition unit 640 may determine that a cliff exists on the left side of the main body 110.

On the other hand, when the first light pattern P1 has a cross shape, the control unit 1800 may determine whether there is an obstacle by considering both the position of the horizontal line and the length of the vertical line.

Hereinafter, description will be given of an implementation in which the first and second pattern irradiation units of the cleaner 100 proposed in the present disclosure irradiate light to the lower and upper sides of the cleaner, with reference to FIG. 10.

Figure 10:
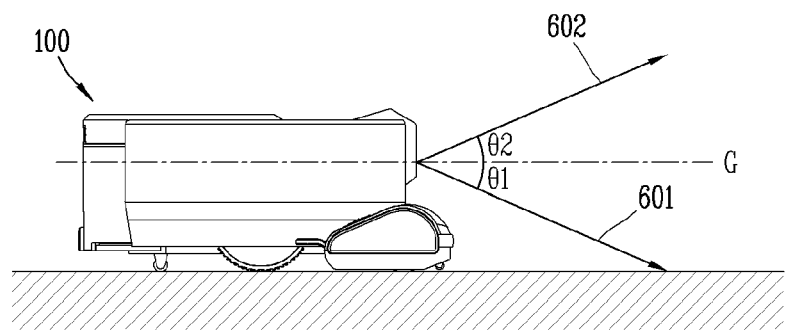
FIG. 10 is a conceptual view illustrating one implementation of a cleaner irradiating light.

As illustrated in FIG. 10, the first pattern irradiation unit 620 may irradiate a first light 601 toward the floor, and the second pattern irradiation unit 630 may irradiate a second light 602 toward the upper side of the main body.

Referring to FIG. 10, the first light 601 may form a first angle θ1 with a predetermined plane G in parallel to the floor, and the second light 602 may form a second angle θ2 with the plane G.

The first angle θ1 and the second angle θ2 may be different from each other. In one example, the first angle θ1 may be set to be smaller than the second angle θ2.

Figure 11:
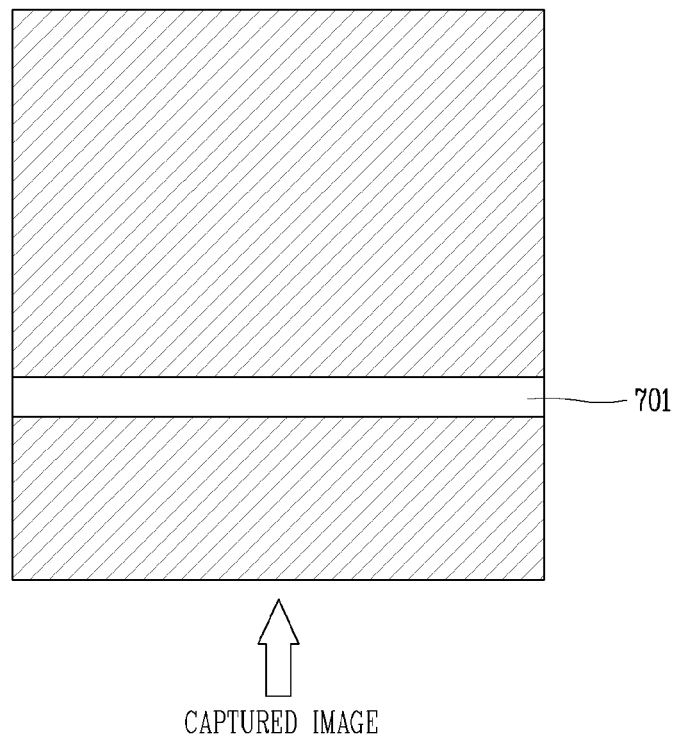
FIG. 11 is a conceptual view illustrating one example of an image acquired by a cleaner.

FIG. 11 illustrates an image acquired by the image acquisition unit 640.

Referring to FIG. 11, the image acquisition unit 640 may capture that light irradiated by the first pattern irradiation unit 620 forms a light pattern 701 on the floor of the cleaning area.

When there is no obstacle in front of the cleaner 100 and the floor is flat, the light pattern 701 in the shape of a line segment may be formed as illustrated in FIG. 11.

Figure 12:
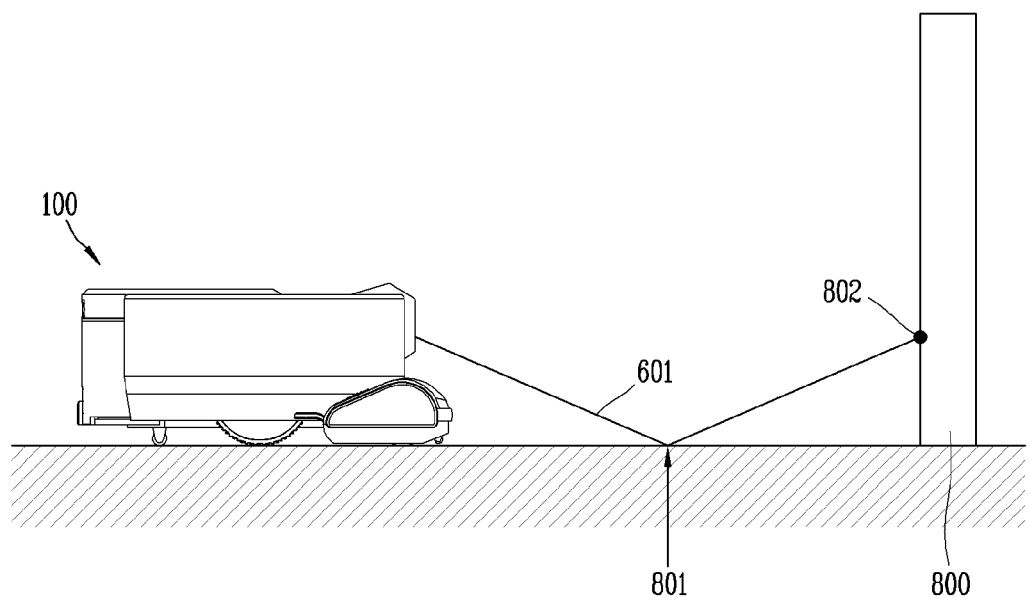
FIG. 12 is a conceptual view illustrating one implementation of a cleaner irradiating light.

Meanwhile, referring to FIG. 12, due to the light reflection characteristic of the floor, a light pattern existing on the floor may become slightly dark or the shape of the light pattern may be distorted.

In particular, when the floor is made of glass, mirror, black marble, or high-gloss material, such phenomenon as illustrated in FIG. 12 may occur.

That is, when a first light is irradiated to the floor made of the material, a light pattern is not formed on a point where the first light and the floor first meet, which causes a problem that an existing traveling method using light patterns cannot be completely applied.

Specifically, the first light 601 irradiated by the first pattern irradiation unit 620 may be reflected from a first point 801 of the floor so as to reach a second point 802 of an obstacle 800. In this case, a first light pattern may be formed at the first point 801 and a second light pattern may be formed at the second point 802.

Figure 13:
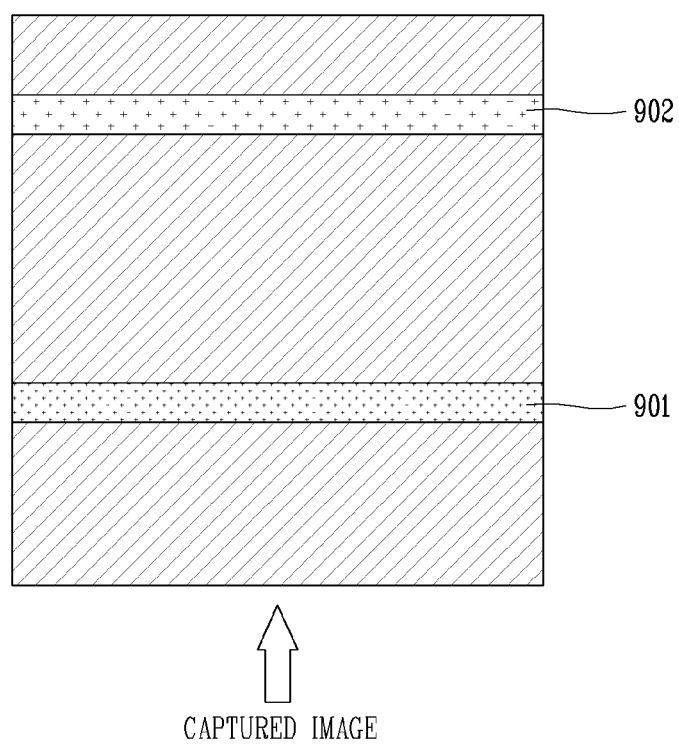
FIG. 13 is a conceptual view illustrating one example of an image acquired by a cleaner.

As illustrated in FIG. 12, when the first light 601 reaches the first and second points 801 and 802, the image acquisition unit 640 may acquire an image as illustrated in FIG. 13.

That is, the image acquired by the image acquisition unit 640 may include a first light pattern 901 formed at the first point 801 and a second light pattern 902 formed at the second point 802.

Comparing FIGS. 11 and 13 with each other, brightness of the light pattern 701 included in the image illustrated in FIG. 11 and brightness of the first and second light patterns 901 and 902 included in the image illustrated in FIG. 13 may be different from each other.

That is, unlike the case in which the light irradiated by the first pattern irradiation unit merely reaches the floor, since the light in FIG. 13 is reflected, the brightness of the light pattern 701 and the brightness of the light pattern 901 are different from each other. In one example, the brightness of the first light pattern 901 may be darker than that of the light pattern 701 of FIG. 11.

On the other hand, the brightness of the first light pattern 901 formed at the first point 801 where the first light 601 has first reached may be different from the brightness of the second light pattern 902 formed at the second point 802 where the first light 601 has secondly reached. In one example, the brightness of the first light pattern 901 may be darker than that of the second light pattern 902.

Figure 14:
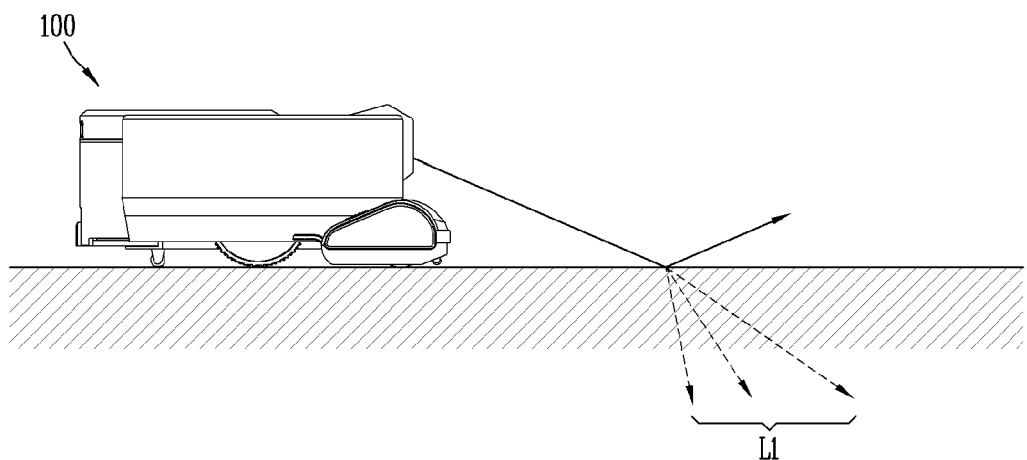
FIG. 14 is a conceptual view illustrating light irradiated from a cleaner.
Figure 15:
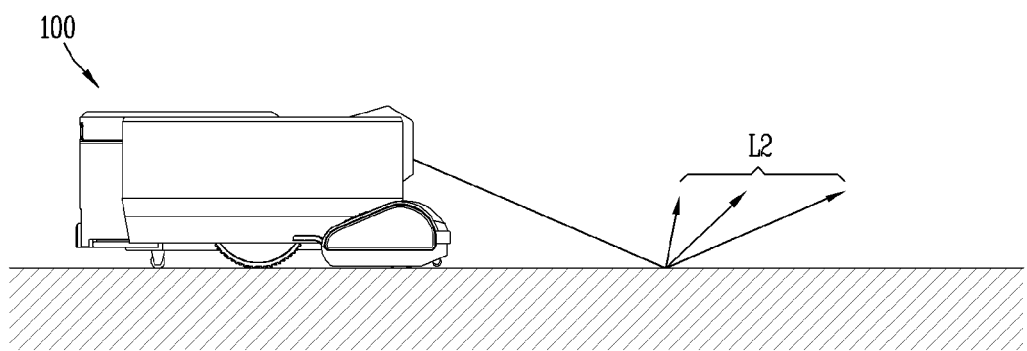
FIG. 15 is a conceptual view illustrating light irradiated from a cleaner.

In FIGS. 14 and 15, conditions in which the light pattern is not normally formed on the floor of the cleaning area will be described.

As illustrated in FIG. 14, a part L1 of the first light may be absorbed by the floor formed of a specific material. In this case, a light pattern formed at a reference position may be formed relatively dark.

As illustrated in FIG. 15, a part L2 of the first light may be diffusely reflected at the reference position on the floor. In this case, the light pattern formed at the reference position may be formed relatively dark.

Hereinafter, a method for controlling a cleaner 100 according to the present disclosure will be described.

First, when the main body is moving, the control unit 1800 may control the pattern irradiation unit to irradiate light in a predetermined pattern toward the front lower (or lower front) side of the main body.

In addition, the control unit 1800 may control the image acquisition unit 640 to acquire an image of the front of the main body.

In addition, the control unit 1800 may detect a light pattern included in the acquired image.

In one example, the control unit 1800 may determine whether a light pattern is included in the image. Furthermore, the control unit 1800 may detect at least one of number, form, length, thickness, and shape of light patterns existing in the image.

In another example, the control unit 1800 may detect a position of the light pattern in the acquired image. Also, the control unit 1800 may detect a relative position between the position of the light pattern and the reference position in the acquired image.

The control unit 1800 may determine whether an obstacle exists in front of the main body based on brightness of the detected light pattern.

In addition, the control unit 1800 may control the driving unit 1300 to pass or avoid the obstacle based on the brightness of the light pattern.

When the brightness of the detected light pattern is less than or equal to a preset reference brightness, the control unit 1800 may control the driving unit 1300 to reduce a moving speed of the main body.

That is, when the brightness of the light pattern is darker than the reference brightness, the control unit 1800 may determines that the main body has entered a dangerous situation even if the light pattern exists at the reference position in the image, and may reduce the moving speed of the main body.

Meanwhile, when the brightness of the detected light pattern is darker than the reference brightness, the control unit 1800 may exclude the light pattern from criteria for determining the obstacle.

That is, when the brightness of the light pattern included in the image captured by the image acquisition unit is darker than the reference brightness, the control unit 1800 may determine that the light pattern is not included in the image. When any light pattern is not detected, the control unit 1800 may determine that the main body has entered a dangerous situation and may reduce the moving speed of the main body.

Meanwhile, the cleaner 100 according to the present disclosure may include a laser sensor (not illustrated) for detecting information related to a material of the floor.

In one implementation, the control unit 1800 may variably set reference brightness based on an output of the laser sensor.

For reference, the laser sensor may emit predetermined laser beams to the floor and receive the laser beams reflected from the floor.

In one implementation, the control unit 1800 may increase the reference brightness as an amount of laser beams received by the laser sensor decreases. That is, the control unit 1800 may increase the reference brightness used for determining the light pattern as an amount of laser beams reflected from the floor of the cleaning area decreases.

In another implementation, when the amount of laser beams received by the laser sensor exceeds a preset limit value, the control unit 1800 may detect information related to an obstacle using the light pattern, regardless of the brightness of the light pattern.

Meanwhile, the control unit 1800 may compare a position at which the light pattern is detected with a reference position set in the obtained image, and variably set the reference brightness based on the comparison result.

The control unit 1800 may increase the reference brightness when a light pattern with brightness less than or equal to the reference brightness is located at a position higher than the reference position.

That is, as illustrated in FIG. 9B, when the light pattern is located above the reference position ref1 in the image, the reference brightness may increase.

Also, the control unit 1800 may variably set the reference brightness based on information related to a form of a light pattern. For example, the information related to the form of the light pattern may include information related to at least one of thickness, shape, size, and length of the light pattern.

The control unit 1800 may variably set the reference brightness based on the number of light patterns included in the image.

In one implementation, the control unit 1800 may increase the reference brightness when a plurality of light patterns exists in the image.

That is, as illustrated in FIG. 13, when a plurality of light patterns is detected from one image, the control unit 1800 may increase the reference brightness.

For example, the plurality of light patterns may include a first light pattern 901 and a second light pattern 902. The first light pattern 901 may be located to correspond to a reference position set in the image, and the second light pattern 902 may be located above the reference position.

In this case, when the brightness of at least one of the first and second light patterns is less than the reference brightness, the control unit 1800 may control the driving unit 1300 to reduce the moving speed of the main body.

In one implementation, the control unit 1800 may variably set the reference brightness based on an angle that is formed between a line segment formed by a light pattern and a reference line set in the image.

Specifically, when the angle formed between the line segment formed by the light pattern and the reference line set in the image is equal to or greater than a preset limit angle, the control unit 1800 may increase the reference brightness.

According to the present disclosure, an obstacle recognition method using light patterns can variously be set according to the material of a floor, thereby reducing the probability of erroneous detection of an obstacle due to a cleaning area or an external environment. In addition, according to the present disclosure, since the probability of the erroneous detection of the obstacle is reduced, a cleaning time can also be shortened.

Further, according to the present disclosure, even when it is difficult to accurately detect an obstacle due to an external environment, a collision with such obstacle can be prevented.

The invention claimed is:

1. A self-driving cleaner comprising:
a main body traveling through a cleaning area and sucking foreign substances from a floor in the cleaning area;
a drive unit for moving the main body in the cleaning area;
a pattern irradiation unit, disposed on a front surface of the main body, for irradiating light in a predetermined pattern toward a lower front side of the main body;
a camera, disposed on a front surface of the main body, for photographing the front of the main body; and
a controller for detecting a light pattern formed by the pattern irradiation unit using an image photographed by the camera, determining whether an obstacle exists in front of the main body on the basis of brightness of the detected light pattern, and controlling the drive unit to pass or avoid the obstacle on the basis of a result of the determination,
wherein the controller controls the drive unit to reduce a moving speed of the main body when the brightness of the detected light pattern is less than or equal to a preset reference brightness, and
wherein the controller variably sets the reference brightness based on an angle formed between a line segment formed by the light pattern and a reference line set in the image.

2. The cleaner of claim 1, further comprising a laser sensor configured to detect information related to a material of the floor,
wherein the controller variably sets the reference brightness based on an output of the laser sensor.

3. The cleaner of claim 2, wherein the laser sensor emits predetermined laser beams to the floor, and receives the laser beams reflected from the floor, and
wherein the controller increases the reference brightness as an amount of laser beams received by the laser sensor decreases.

4. The cleaner of claim 1, wherein the controller compares a position at which the light pattern is detected with a reference position set in the image, and variably sets the reference brightness based on a result of the comparison.

5. The cleaner of claim 4, wherein the controller increases the reference brightness when the light pattern with brightness less than or equal to the reference brightness is located above the reference position.

6. The cleaner of claim 1, wherein the controller variably sets the reference brightness based on information related to a form of the light pattern.

7. The cleaner of claim 6, wherein the information related to the form of the light pattern includes information related to at least one of a thickness, shape, size, and length of the light pattern.

8. The cleaner of claim 1, wherein the controller variably sets the reference brightness based on a number of light patterns included in the image.

9. The cleaner of claim 8, wherein the controller increases the reference brightness when a plurality of light patterns exists in the image.

10. The cleaner of claim 9, wherein the plurality of light patterns includes a first light pattern and a second light pattern,
- wherein the first light pattern is located to correspond to a reference position set in the image,
- wherein the second light pattern is located above the reference position, and
- wherein the controller controls the drive unit to reduce the moving speed of the main body when brightness of the second light pattern is less than the reference brightness.

11. The cleaner of claim 1, wherein the controller increases the reference brightness when the angle is equal to or greater than a preset limit angle.

12. The cleaner of claim 1, wherein the controller controls the drive unit to reduce the moving speed of the main body when any light pattern is not detected in the image.

* * * * *